United States Patent [19]

Peterson et al.

[11] 4,132,625
[45] Jan. 2, 1979

[54] SEWAGE OSMOSIS SYSTEM

[75] Inventors: Earl C. Peterson; Frank P. Coolbroth, both of Minneapolis, Minn.

[73] Assignee: Sewage Osmosis Inc., Minneapolis, Minn.

[21] Appl. No.: 887,335

[22] Filed: Mar. 16, 1978

[51] Int. Cl.² .................... B01D 13/02; C02C 5/12
[52] U.S. Cl. ........................... 204/299 R; 204/149; 204/180 R
[58] Field of Search ............... 204/149, 180 R, 275, 204/299, 195 W, 196; 210/170

[56] References Cited

U.S. PATENT DOCUMENTS

| Re. 26,329 | 1/1968 | Hougen | 204/149 |
|---|---|---|---|
| 2,625,374 | 1/1953 | Neuman | 204/180 R X |
| 2,831,804 | 4/1958 | Collopy | 204/180 R X |
| 3,336,220 | 8/1967 | Neidl | 204/149 X |
| 3,417,823 | 12/1968 | Faris | 204/180 R X |
| 3,523,884 | 8/1970 | Bagno | 204/196 |
| 3,647,667 | 3/1972 | Peterson | 204/299 |
| 3,703,453 | 11/1972 | Gordy et al. | 204/149 X |
| 3,915,826 | 10/1975 | Franceschini | 204/180 R |
| 3,975,246 | 8/1976 | Eibl et al. | 204/152 X |

Primary Examiner—Arthur C. Prescott

Attorney, Agent, or Firm—Orrin M Haugen; Thomas J. Nikolai

[57] ABSTRACT

A system for dispersing aqueous effluents from a sewage treatment system utilizing a generally closed septic or sewage retention tank and a subterranean disposal field area for receiving the discharge from the septic tank. The septic tank is arranged to receive raw sewage and to retain solids and ultimately discharge aqueous fluid effluent into the disposal field area. The disposal field is normally disposed adjacent the septic tank vessel and is arranged to receive and disperse the aqueous fluid effluent discharged from the septic tank. Anode means and cathode means are arranged generally laterally of the disposal field with the anodes and cathodes being disposed on opposed sides of the disposal field. The anodes consist essentially of independent cells of crushed raw rock dolomite, hard limestone, or basalt, each of which is a naturally-occurring mineral. An additive of fused dolomite powder is preferably added to each of the anodes, in a suitable quantity as required. The cathodes consist essentially of a material high in carbon content, preferably coke screenings. The anodes and cathodes combine to establish an electrical field across the disposal field, and assist in dispersing the effluent into the soil and ground.

7 Claims, 2 Drawing Figures

SEWAGE OSMOSIS SYSTEM

BACKGROUND OF THE INVENTION

Sewage treatment systems which are commonly utilized in private family dwellings or commercial establishments which are not served by municipal or other sewage treatment facilities conventionally utilize a sewage treatment system including a closed septic tank vessel which receives raw sewage from the dwelling unit or other establishment, this septic tank vessel retaining the solids and discharging aqueous effluent into an adjacent disposal field. Certain installations utilize a dry-well type of disposal field, while others may employ a drain field, with the latter disposal field being generally preferred for most geographical locations, particularly where clay or other heavily compacted soils are present. The selection of disposal fields will normally be determined by the type and effectiveness of the drainage area, including the soil conditions, the topography, and certain other considerations as well.

The rate of discharge of fluid effluent from the disposal area is normally dependent upon the soil condition, as well as the effective area of the field. For given soil conditions and given disposal field areas, it has been determined that discharge of effluent may be accelerated when electrolytic treatment means are employed in the system. In the present system, electrolysis is believed to exist between the anodes and cathodes by virtue of the electrolytes present in the effluent, and the dissimilar nature of the anodes and cathodes. In this system, electrode means including an anode and a cathode prepared from dissimilar materials are arranged laterally adjacent the disposal field, and are electrolytically coupled, one to another, through the electrolytes contained in the sewage effluent. It has been found that the field generated by virtue of the anodes and cathodes assists and enhances the ultimate discharge or drainage of the fluid effluent from the disposal field proper.

When a disposal field consists of coarse gravel, sand, or the like, rates of discharge of aqueous fluid effluent is normally not a problem. However, when dense soils including clay, gumbo, or the like are found, the discharge of aqueous fluid effluent proceeds at a somewhat slower rate. Clay particles are normally composed of thin crystals, the crystals being in the form of atomic sheets. When clay particles are dry, the substance is normally electrically neutral. However, when moistened, clay particles have been found to develop a negative electrical charge. Since water is a bipolar substance, the positive poles of the molecule will adhere to the negatively charged particle, thus forming a shield or sheath of water molecules around the particle. In typical fashion, additional water molecules are held in a second layer or sheath by the exposed negatively charged poles of the first layer. These electrical forces holding or retaining the water molecules in contact with the clay gradually decrease with distance from the clay particle until effectively diminished or lost. The net result is an immobile layer of water surrounding each particle of clay, the immobile layers being surrounded in turn by free water. The amount of free water present in the system will depend upon the available spaces between individual clay particles. In highly dense clay soils, the capillarity can be extremely small, and voids are substantially non-existent.

A pair of dissimilar electrodes are utilized, one forming the anode, and the other the cathode, the pair forming a cell and being electrolytically coupled, one to another, through the electrolytes contained in the sewage effluent. The field generated has been found to cause more rapid dispersal of aqueous fluid in a disposal field, and accordingly a more complete dispersal and a more rapid rate of discharge of effluent from the disposal field.

SUMMARY OF THE INVENTION

Briefly, in accordance with the present invention, a sewage treatment system is provided which consists of a closed septic tank and an adjacent disposal field, the septic tank being arranged to receive raw sewage and to retain solids and discharge aqueous effluent therefrom. The disposal field, which is disposed adjacent the septic tank, receives the aqueous effluent and in order to more effectively distribute the effluent within the area of the disposal field, mutually spaced anodes and cathodes are provided laterally of the disposal field. The material forming the anode is confined generally within a vertical trench formed laterally of the disposal field, with the material consisting essentially of crushed raw rock dolomite, hard limestone, or basalt. An additive of fused dolomite powder is added to the material making up each of the anodes. It has been found that the dispersal of effluent through the disposal field can be improved by spreading or mixing fused dolomite and fine particles of agricultural limestone over the disposal field, preferably mixing this with the soil. These materials have been found to displace hydrogen from water, such as the water found in wet soil. The cathode material which is likewise preferably received within a trench arranged laterally of the disposal field, preferably consists of high carbon coke screenings.

In the present description of the invention, the term "fused dolomite" is used in a comprehensive sense. and is intended to refer to treated mineral rock selected from the group consisting of dolomite, agricultural limestone, and mixtures thereof. Fused dolomite is available commercially, and is prepared by fusing dolomite in an electric furnace. Fused dolomite, for example, is rich in both calcium and magnesium oxides, and contains only a slight quantity of carbon dioxide.

Therefore, it is a primary object of the present invention to provide an improved means for treating aqueous effluents from septic vessels, the means including the provision of spaced anode and cathode cells, with the material forming the anode consisting essentially of crushed raw rock dolomite, hard limestone, or basalt, preferably with an additive of fused dolomite powder, and with the cathode materials consisting of high carbon coke screenings.

It is a further object of the present invention to provide an improved means for dispersing aqueous effluents discharged from septic tank vessels, which includes the provision of a pair of spaced electrolytic cells including an anode and a cathode, with the material forming the anode consisting essentially of crushed raw rock dolomite, hard limestone, or basalt, with or without an additive of fused dolomite powder, and with the material forming the cathode consisting essentially of high carbon coke.

Other and further objects of the present invention will become apparent to those skilled in the art upon a study of the following specification, appended claims, and accompanying drawing.

DESCRIPTION OF THE PREFERRED EMBODIMENT

Figure 1:
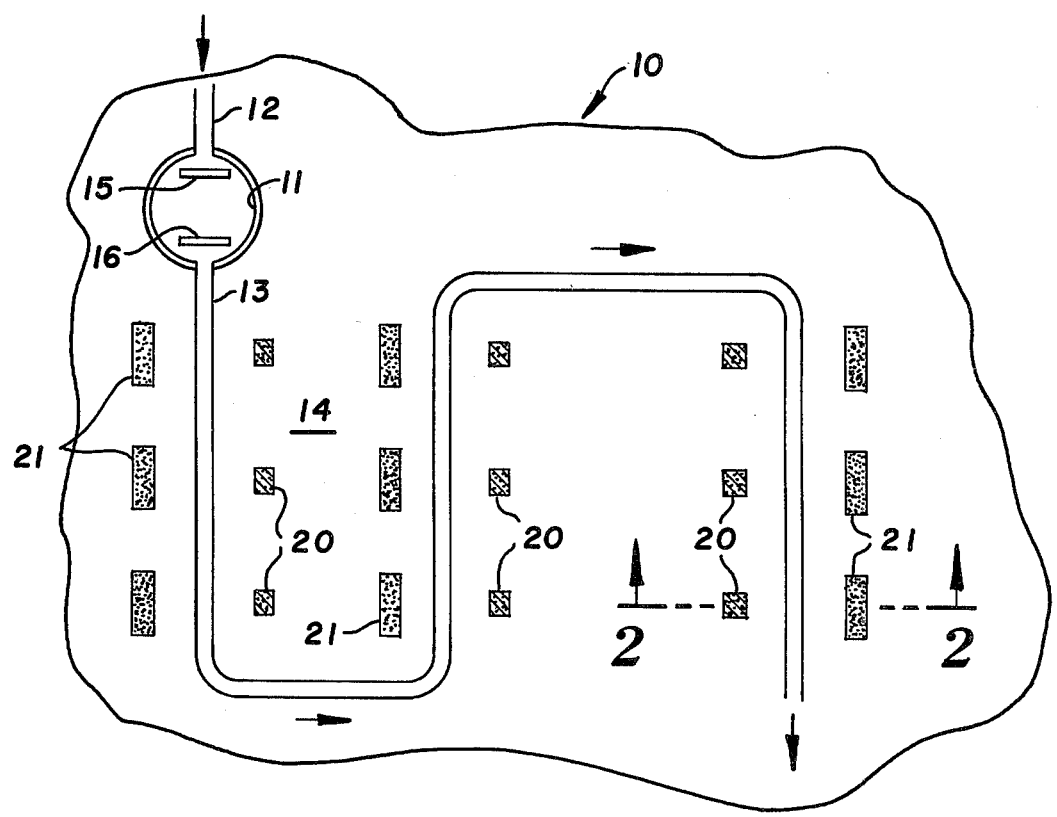
FIG. 1 is a schematic diagram of a typical septic tank and disposal field, with the disposal field having a sewage conduit extending therethrough, and with anodes and cathodes being arranged on opposite sides of said sewage conduit.
Figure 2:
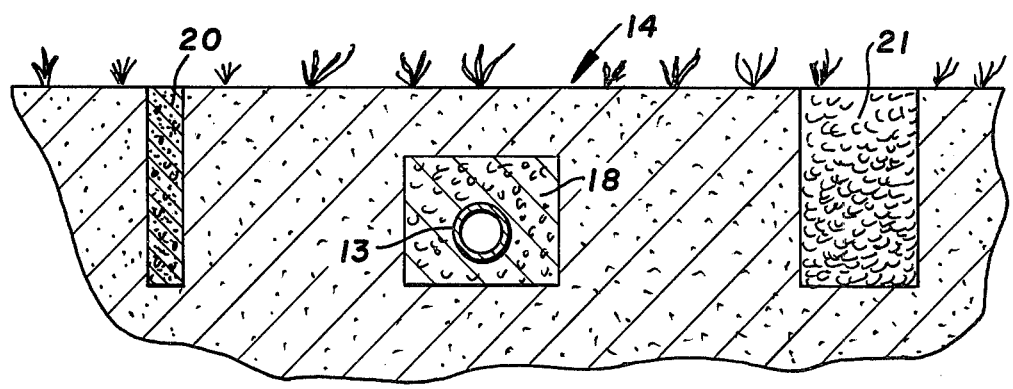
FIG. 2 is a vertical sectional view taken along the line and in the direction of the arrows 2—2 of FIG. 1.

With particular attention being directed to FIGS. 1 and 2 of the drawing, the system generally designated 10 includes a closed septic tank vessel 11 having an inlet line 12 coupling the tank to a source of sewage, and an outlet line 13 coupling the septic tank 11 to the disposal area or field shown generally at 14. The septic tank 11 is provided with conventional baffles as at 15 and 16, and is, of course, of a size adequate to receive, retain, and otherwise treat sewage obtained through the inlet line 12. In certain installations, it may be desirable to aerate the septic tank continuously, or periodically, with such aeration systems being, of course, commercially available.

Outlet line 13 is traditionally formed as drain-tile, with the drain-tile being embedded in a gravel bed as at 18. Binder rock or other gravel is normally utilized for surrounding the drain-tile segments 13—13, and, if desired, a film of polyethylene or other durable material may be applied over the upper semi-cylindrical surface of the tiles in order to avoid or reduce the influx of finely-divided particles into the confines of the drain-tile. The disposal field 14 is provided with spaced anodes and cathodes, with a typical anode being shown at 20, and with a typical cathode being shown at 21. Essentially, the anodes and cathodes are formed by placing anode material and cathode material respectively within trenches formed in the soil adjacent the discharge line 13, and within or adjacent the disposal field 14. Typically, the material forming the anode consists of crushed raw rock dolomite, hard limestone, or basalt, preferably mixed with a quantity of fused dolomite powder, with the material forming the cathode consisting of high carbon coke, with pulverulent materials being contemplated for both the anode cell and the cathode cell.

As has been indicated, the term "fused dolomite" is used in a comprehensive sense, and includes treated mineral rock selected from the group consisting of dolomite, agricultural limestone, and mixtures thereof. Typically, naturally-occurring materials such as dolomite, or dolomite limestone, are placed in an electric furnace and fused at high temperatures to discharge the carbon dioxide therefrom. Carbon dioxide is present in the raw materials in the form of carbonates, as is well known. The utilization of the fused materials has been found to enhance the operation of the overall system.

As has been indicated, the anode material is preferably relatively high in the Electromotive Force Series of Elements. Both calcium and magnesium may become ionized to form cations by contact with water. In contact with water, these elements can and do displace quantities of hydrogen from water, such as the effluent found in wet soil of disposal areas. It is known that in conventional electrical use, electrons flow on or through a metallic conductor with the rate being determined by the overall resistivity. It is also known that in the electroosmosis concept, the flow of cations to a negatively charged cathode will occur, while anions will, as is traditional, migrate to the anode. It is also believed that if a proper high carbon material is used for the material forming the cathode, the low ohmic resistance of the carbon and the surrounding soils will permit electrical conductivity to occur with only modest field resistance. The overall low ohmic resistance then permits a reasonably rapid transfer of charged ions between the anodes and cathodes, the anions migrating to the anodes and with the cations migrating to the cathodes. In certain applications, it has been found desirable to have atmospheric vents to vent the cathodes to atmosphere so as to reduce or eliminate gas blocking at the surface of the material forming the cathode.

In a typical installation, the anode cells will be formed within rectangular openings, preferably about 2 feet wide, 5 feet long, and 5 feet deep. The drain-tile in a typical drain field will be at a minimum of 6 inches below the surface, and at a maximum of approximately 10 inches, more or less, depending upon the typical frost depth in the area and also the volume of effluent to be disposed of in the disposal field. Also, typically, the cathode material will be confined within rectangular openings formed in the soil laterally of the discharge conduit 13 of the disposal field, with the cathodes typically being somewhat larger area cells than the corresponding anodes, and being preferably in the form of spaced rectangular openings having a length of 6 feet, width of 2 feet, and a depth of 5 feet. It will be appreciated, of course, that the relative sizes of the cells are not critical, it being appreciated that the cell size given is sufficient for providing approximately 2 tons of high carbon coke on one side of the disposal field, and 4 tons of dolomite, hard limestone, or basalt adjacent the discharge line and spaced from the high carbon coke. Typically, approximately 10 pounds of fused dolomite powder is added to each 500 pounds of rock dolomite, hard limestone, or basalt. In the selection of materials, rock dolomite is preferred, and it has been found that limestone such as agricultural limestone or basalt may be employed suitably. Mixtures of dolomite and hard limestone are also useful. Mixtures of 50:50 rock dolomite to hard limestone are of utility as well. Typically, the cells are spaced 25 feet laterally from the center line of the outlet line running in the disposal field. The individual cells may be spaced approximately 20 feet apart, although closer spacings may, of course, be utilized. Typical voltage measurements between adjacent anodes and cathodes is in the area of about 1.5 volts.

As has been indicated, in certain disposal areas, a broadcast of fused dolomite may be employed in order to assist in the activity of the disposal field. In such an arrangement, approximately 300 pounds of fused dolomite is used and mixed with the soil of approximately 2400 square feet of disposal area. The presence of fused dolomite in the system described herein has been found to increase the standing level of the effluent within the disposal field.

While it is appreciated that the chemical analysis of the various fused dolomites which are commercially available may vary, from one locale to another, depending upon the nature of the raw materials selected, one typical chemical analysis for fused dolomite available from Rockwell Lime Company of Manitowoc, Wisc. is as follows:

| Component | Percentage |
| --- | --- |
| Silica | 0.73 % |
| Iron oxide | 0.18 % |
| Aluminum oxide | 0.62 % |
| Calcium oxide | 46.65 % |
| Magnesium oxide | 32.43 % |
| Total sulfur | 0.03 % |
| Sulfur trioxide | 0.05 % |
| Phosphorus pentoxide | trace |
| Water at 120° C. | 0.64 % |
| Total water | 18.66 % |
| Carbon dioxide | 1.50 % |
| Manganese | 0.02 % |
| Loss on Ignition | 20.16 % |
| Available lime index | 88.10 % |
| Calcium oxide (non-volatile basis) | 58.43 % |
| Magnesium oxide (non-volatile basis) | 40.62 % |
| Retained on #30 mesh | nil |
| Fineness thru 200 mesh | 90.00 % |

The typical chemical analysis for the dolomitic limestone which is used in the fusion process is as follows:

| Component | Percentage |
| --- | --- |
| Silica | 0.27 % |
| Iron oxide | 0.24 % |
| Aluminum oxide | 0.36 % |
| Calcium oxide | 32.56 % |
| Magnesium oxide | 19.38 % |
| Phosphorus | trace |
| Manganese | trace |
| Sulfur trioxide | trace |
| Carbon dioxide | 46.60 % |

It will be observed that the significant difference between the raw material and the fused dolomite is in the carbon dioxide content, as expected.

Other fused dolomite formulations available commercially throughout this country may contain up to about 60% calcium, present as calcium oxide, and 40% magnesium, present as magnesium oxide. Lesser quantity of oxides including oxides of silica and aluminum are present.

In the system illustrated in the drawing, the effluent is normally flowing continuously from the septic tank into the disposal field, with the rate of flow depending upon the height of the column of sewage contained within the septic tank 11. This sewage moves through the outlet 13, typically in the form of drain-tile, so as to disperse the effluent throughout the entire disposal field 14. The presence of the spaced anodes and cathodes has been found to provide an electrical field across the disposal field, and thereby accelerates the migration, or dispersal of the effluent throughout the disposal field.

The present theoretical explanation of the mechanism is not entirely understood or appreciated, however it has been found that a practical application of the concept is in those typical home sewage treatment systems which include a closed septic tank and an adjacent disposal field typically in the form of a drain field. The system is related to and is considered as an improvement on the sewage treatment system disclosed and claimed in U.S. Pat. No. 3,647,667, dated Mar. 7, 1972, of Earl C. Peterson, named as an inventor herein.

The system disclosed herein may also be adapted for the disposal of ground water or surface waters which collect as a result of rainfall, or other aqueous discharges. In other words, it is not a requirement that the water be from a polluted source, although the arrangement has been found to be most readily adaptable to the treatment of waters from sources which may constitute sources of pollution. The normal discharge of sewage from a dwelling frequently includes a substantial percentage of phosphate salts, which are presently utilized in certain detergents, soaps, and the like. Also, other salts in the form of chlorides and nitrates are commonly present in sewage from family dwellings. These salts, being ionic in nature, are believed to migrate under the influence of the electrical field, with the system being further believed capable of generation of minor quantities of hydrogen through electrolytic decomposition of water containing electrolytes. The generation of free hydrogen, or hydronium ions is believed to further contribute to the treatment of the sewage effluent, since a corresponding quantity of nacent oxygen will be formed from the electrolysis of water. The presence of the nacent oxygen at or adjacent the anodes will further enhance the treatment, it is believed.

In certain locations, such as in heavy or rocky soils, or in areas having a high ground water table, it has been found desirable to confine the sewage effluent into a sealed bed so that the discharge from the zone will not contaminate the ground water. This may be achieved by initially excavating an area or zone to form a trench having a depth of approximately 4 feet, a width of approximately 12 feet, and a length of approximately 36 feet. This is an adequate area for most residential dwellings, however certain soil conditions may require somewhat larger or smaller excavations to accomplish the purpose. Generally speaking, however, the depths of 4 feet is retained. The bottom and side walls of the trench are then lined with a water impervious film such as polyethylene, polyethylene terephthalate (Mylar) or the like. Six mil polyethylene film has been found useful, although multiple layers of this material may be employed to achieve the desired thickness. The water-impervious film will, accordingly, isolate the sewage effluent from the ground water present in the area, and will also prevent the outflow of the effluent from the sealed bed into adjacent soil zones.

An anode structure having a length of approximately 6 feet is provided at the inlet end of the bed, and is constructed as follows: The lined trench is provided with a layer of approximately 4 inches of clay soil, with this material being compacted in the base of the anode area and covered with a water-impervious film such as two layers of 6-mil polyethylene. A sheet of plywood may then be inserted to temporarily retain the raw crushed dolomite, hard limestone, or basalt in place, and approximately 25 pounds of fused dolomite may be mixed with the anode material. This ratio of fused dolomite is the same as has been previously discussed hereinabove.

Thereafter, a second plywood sheet is inserted approximately 3 feet from the opposed end of the trench in order to retain the cathode materials, specifically high carbon materials. The second plywood sheet is utilized as a temporary retainer in order to hold the coke material in place pending back-fill of the trench area. Thereafter, clay back-fill is compacted into the trench area between the anode, and upon filling, the plywood retainer elements may be removed.

It has been found further desirable to provide two or more zones for providing fused dolomite for the sealed bed. Specifically, two or more 4-inch diameter vertical bores may be formed in the compacted clay of the trench, with these bores being filled with fused dolomite, and compacted into the bores.

While coke may be employed as the material for forming the cathodes, as mentioned hereinabove in connection with the invention, coke materials of differing characteristics may be employed in adjacent cathode zones if desired. Also, the cathode zones may be provided with vertical inspection ports, and in the event the system becomes overloaded, a gathering system may be employed to remove surplus water from the cathode zone for recycling through the entire system.

Serial sealed beds may be utilized as well, with the size of the sealed bed described above having been found desirable from the standpoint of operation of the anode and cathode in combination with the system.

As of the present time, there is an increasing awareness of the large quantities of sewage effluent which are being discharged into flowing bodies, such as rivers, streams, and the like. Furthermore, in certain areas sewage effluent may be discharged directly into lakes, and any discharge of such materials into natural waters is definitely not desirable. In certain applications, effluent is discharged by spray, or a pumped flow over agricultural land for fertilization purposes. In such an area, where large quantities of effluent are discharged on the surface, it has been found helpful to utilize a series of anodes and cathodes on opposed sides of the flooded area. The flooding may occur, as indicated, by pumping directly onto the surface, or by spraying, with spraying providing some significant aeration for the materials. In such an arrangement, approximately 200 pounds of fused dolomite and crushed agricultural limestone (mixed 50:50) is utilized and mixed with the soil of approximately 2400 square feet of the disposal area. It is believed that this will increase the ability of soil to treat the sewage effluent, and to promote plant growth. Water retention is also increased with a lesser discharge of water to flood plains and rivers.

As has been indicated, a quantity of fused dolomite powder may be added over the entire disposal field and mixed with the soil covering the field. In certain instances, it may be desirable to utilize a 50:50 mixture of fused dolomite powder and pulverized agricultural limestone, although up to two-thirds of the mixture may be fused dolomite. The presence of these materials has been found to raise the moisture level in the field and assist in disposal.

We claim:

1. Means for dispersing aqueous effluents from a sewage treatment system consisting of a generally closed septic tank and an adjacent disposal field, the arrangement comprising:
   (a) a generally closed septic tank vessel arranged to receive raw sewage and to retain solids therein and discharge aqueous fluid effluent therefrom;
   (b) a disposal field disposed adjacent said septic tank vessel and arranged to receive aqueous effluent from said septic tank vessel;
   (c) anode means and cathode means arranged generally laterally of said disposal field with said anodes and cathodes being disposed on opposed sides of said disposal field; and
   (d) said anode means consisting essentially of at least one discrete cell of a crushed raw rock mineral selected from the group consisting of dolomite, hard limestone, and basalt, together with approximately 1% to about 67% of fused dolomite based on the rock mineral, and with said cathode means consisting essentially of at least one discrete cell of high carbon coke.

2. The system as defined in claim 1 being particularly characterized in that said anode means comprises a plurality of discrete spaced apart anodes, and wherein said cathode means comprises a plurality of discrete spaced apart cathodes.

3. The system as defined in claim 1 being particularly characterized in that a discharge line is coupled to said septic tank and extends into said disposal field, and with said anode cells being spaced apart from said cathode cells across said discharging line.

4. The system as defined in claim 1 being particularly characterized in that said fused dolomite consists of a fusable mineral rock selected from the group consisting of dolomite, agricultural limestone, and mixtures thereof 5. The system as defined in claim 1 being particularly characterized in that each of said anode cells and cathode cells are formed as generally vertical earth trenches containing a fill of anode material and cathode material respectively.

6. A system for treating aqueous effluents from a sewage treatment system consisting of a primary treatment tank and a disposal field, the system comprising:
   (a) s primary treatment vessel arranged to receive raw sewage and to retain solids therein and discharge aqueous effluent therefrom;
   (b) a disposal field disposed in spaced relationthip to said primary treatment vessel and arranged to receive aqueous effluent from said primary treatment vessel;
   (c) anode means and cathode means arranged in spaced relationship within said disposal field; and
   (d) said anode means consisting essentially of at least one discrete cell of crushed raw rock mineral selected from the group consisting of dolomite, hard limestohe, and basalt, together with approximately 1% to about 67% of fused dolomite based on the rock mineral, and with said cathode means consisting essentially of at least one discrete cell of high carbon coke.

7. The system as defined in claim 6 being particularly characterized in that disposal field consists of a trench lined with water-impervious film, and with said trench being filled with earth.

* * * * *